United States Patent
Walters

(10) Patent No.: US 10,107,447 B2
(45) Date of Patent: *Oct. 23, 2018

(54) PULL-OUT SWIVEL MOUNT

(71) Applicant: Peerless Industries, Inc., Aurora, IL (US)

(72) Inventor: James D. Walters, St. Charles, IL (US)

(73) Assignee: Peerless Industries, Inc., Melrose Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/847,230

(22) Filed: Dec. 19, 2017

(65) Prior Publication Data

US 2018/0106417 A1 Apr. 19, 2018

Related U.S. Application Data

(63) Continuation of application No. 15/394,202, filed on Dec. 29, 2016, now Pat. No. 9,851,047, which is a
(Continued)

(51) Int. Cl.
*F16M 11/08* (2006.01)
*F16M 11/10* (2006.01)
(Continued)

(52) U.S. Cl.
CPC ......... *F16M 11/2007* (2013.01); *F16M 11/08* (2013.01); *F16M 11/10* (2013.01);
(Continued)

(58) Field of Classification Search
CPC ........ F16M 11/04; F16M 13/02; F16M 11/38; F16M 11/12; F16M 11/10; F16M 11/08;
(Continued)

(56) References Cited

U.S. PATENT DOCUMENTS

| 419,521 A | 1/1890 | Heald et al. |
| 848,465 A | 3/1907 | Homeyer |

(Continued)

FOREIGN PATENT DOCUMENTS

| EP | 1 586 803 A2 | 10/2005 |
| WO | WO 2004/002282 A2 | 1/2004 |

OTHER PUBLICATIONS

*Peerless Industries, Inc. v. Loctek Visual Technology Corp.*, Loctek Visual Technology Corp.'s Initial Non-Infringement and Invalidity contentions, Civil Action No. 12-cv-6248, filed Nov. 16, 2012, 81 pages.

(Continued)

*Primary Examiner* — Jonathan Liu
*Assistant Examiner* — Guang H Guan
(74) *Attorney, Agent, or Firm* — Foley & Lardner LLP

(57) ABSTRACT

A system for mounting a flat panel television or display to a surface such as a wall. A base plate is configured to operatively connect to a surface, while an adapter plate is configured to operatively connect to a display device. A plurality of connecting arms are used to operatively connect the base plate to the adapter plate. Each of the plurality of connecting arms includes a base plate engagement portion slidably engageable with slots in the base plate and an adapter plate engagement portion operatively connected to the adapter plate. Movement of the base plate engagement portions within the base plate's slots results in a translational movement of the adapter plate relative to the base plate.

12 Claims, 11 Drawing Sheets

Related U.S. Application Data continuation of application No. 12/986,586, filed on Jan. 7, 2011, now Pat. No. 9,551,453, which is a continuation of application No. 11/528,200, filed on Sep. 27, 2006, now Pat. No. 7,866,621.

(60) Provisional application No. 60/723,158, filed on Oct. 3, 2005.

(51) Int. Cl.
*F16M 11/12* (2006.01)
*F16M 11/20* (2006.01)

(52) U.S. Cl.
CPC ......... *F16M 11/12* (2013.01); *F16M 11/2014* (2013.01); *F16M 11/2092* (2013.01); *F16M 11/126* (2013.01); *F16M 2200/025* (2013.01); *F16M 2200/061* (2013.01)

(58) Field of Classification Search
CPC ........... F16M 11/2007; F16M 11/2014; F16M 11/2085; F16M 11/2092; F16M 2200/061
USPC ............ 248/279.1, 285.1, 286.1, 287.1, 917, 248/920–923, 274.1, 289.11, 282.2, 248/282.1; 108/50.02, 145; 312/7.2, 312/405, 405.1, 196, 223.3, 246; 62/125; 52/239
See application file for complete search history.

(56) References Cited

U.S. PATENT DOCUMENTS

| | | | |
|---|---|---|---|
| 1,695,357 A | 12/1928 | Worden | |
| 2,825,152 A | 3/1958 | Baylon | |
| 3,022,037 A | 2/1962 | Stallard | |
| 3,292,902 A | 12/1966 | Lynch | |
| 3,410,328 A | 11/1968 | Sasai | |
| 3,490,603 A | 1/1970 | Willer | |
| 3,623,707 A | 11/1971 | Klopp | |
| 3,823,915 A | 7/1974 | Koehler | |
| 4,219,186 A | 8/1980 | Brewer | |
| 4,678,230 A | 7/1987 | Winkle | |
| 4,700,921 A | 10/1987 | Holbrook | |
| 5,088,790 A | 2/1992 | Wainwright et al. | |
| 5,217,181 A | 6/1993 | Hammarskjold et al. | |
| 5,330,147 A | 7/1994 | Volcheff et al. | |
| 5,393,029 A | 2/1995 | Senko | |
| 5,553,919 A | 9/1996 | Dennis | |
| 5,847,685 A | 12/1998 | Otsuki | |
| 6,402,109 B1 | 6/2002 | Dittmer | |
| 6,427,607 B1 | 8/2002 | Palmer | |
| 6,604,722 B1 | 8/2003 | Tan | |
| 6,682,157 B2 | 1/2004 | Ito | |
| D488,708 S | 4/2004 | Lam et al. | |
| D489,599 S | 5/2004 | Lam | |
| D493,800 S | 8/2004 | Pfister et al. | |
| D494,596 S | 8/2004 | Pfister | |
| D497,537 S | 10/2004 | O'Keene et al. | |
| 6,816,364 B2 * | 11/2004 | Helot | F16M 11/105 248/919 |
| 6,851,226 B2 | 2/2005 | McGregor et al. | |
| D505,858 S | 6/2005 | O'Keene | |
| 6,905,101 B1 | 6/2005 | Dittmer | |
| 7,028,961 B1 | 4/2006 | Dittmer et al. | |
| 7,063,295 B2 | 6/2006 | Kwon | |
| D530,595 S | 10/2006 | Lam et al. | |
| 7,152,836 B2 | 12/2006 | Pfister et al. | |
| 7,178,774 B2 | 2/2007 | Kim | |
| D562,830 S | 2/2008 | Katagiri et al. | |
| 7,866,621 B1 | 1/2011 | Walters | |
| 7,891,620 B2 | 2/2011 | Grabania et al. | |
| 8,654,275 B2 | 2/2014 | Cheng | |
| 8,864,000 B2 | 10/2014 | Meyer | |
| 9,551,453 B2 | 1/2017 | Walters | |
| 9,851,047 B1 * | 12/2017 | Walters | F16M 11/08 |
| 2002/0179801 A1 | 12/2002 | Kim | |
| 2005/0127253 A1 | 6/2005 | Kim | |
| 2006/0125360 A1 | 6/2006 | Kim et al. | |
| 2006/0284031 A1 * | 12/2006 | Whalen | A47B 81/061 248/125.8 |
| 2007/0023599 A1 | 2/2007 | Fedewa | |
| 2011/0163215 A1 | 7/2011 | Walters | |

OTHER PUBLICATIONS

*Peerless Industries, Inc*, v. *Loctek Visual Technology Corp.*, Loctek Visual Technology Corp.'s Exhibit C-1, Invalidity Claim Chart for U.S. Pat. No. 8,157,233 based on Peerless ST630P Mount, Civil Action No. 12-cv-6248, filed Nov. 16, 2012, 15 pages.

*Peerless Industries, Inc*, v. *Loctek Visual Technology Corp.*, Loctek Visual Technology Corp.'s Exhibit C-2, Invalidity Claim Chart for U.S. Pat. No. 8,157,233 based on Peerless SA771PU Mount, Civil Action No. 12-cv-6248, filed Nov. 16, 2012, 15 pages.

*Peerless Industries, Inc*, v. *Loctek Visual Technology Corp.*, Loctek Visual Technology Corp.'s Exhibit C-3, Invalidity Claim Chart for U.S. Pat. No. 8,157,233 based on Peerless SA740P Mount, Civil Action No. 12-cv-6248, filed Nov. 16, 2012, 15 pages.

Technical Data sheet—Flat-Panel Pull-out Swivel Wall Mount, Models SP 850, SP 850P, SP 850-S, SP 850p-S, Sheet No. 202-9505-4, Mar. 5, 2007, 3 pages.

Technical Data sheet—Flat-Panel Pull-out Swivel Wall Mount with Universal Adapter Bracket, Models: SP850-UNL, SP850UNLP, SP850-UNL-S, SP850-UNLP-S, SP850-UNLP-GB, SP850-UNLP-GS, Sheet No. 202-9550-2, Dec. 15, 2006, 4 pages.

Technical Data Sheet—Flat-Panel Pull-out Swivel Wall Mount, Models: FPS 1000, FPS 1000-GB, Sheet No. 202-9504-6, Dec. 15, 2006, 2 pages.

Sanus Vision Mount—VMAA26, Model VMAA26, 2010, Installation Instructions, 50 pages.

\* cited by examiner

PULL-OUT SWIVEL MOUNT

CROSS-REFERENCE TO RELATED APPLICATIONS

This application is a continuation of U.S. patent application Ser. No. 15/394,202, filed Dec. 29, 2016, which is a continuation of U.S. patent application Ser. No. 12/986,586, filed Jan. 7, 2011, now U.S. Pat. No. 9,551,453, which is a continuation of U.S. patent application Ser. No. 11/528,200, filed Sep. 27, 2006, now U.S. Pat. No. 7,866,621, U.S. patent application Ser. No. 11/528,200 claims priority to U.S. Provisional Patent Application No. 60/723,158, filed Oct. 3, 2005. All of the above-referenced applications are incorporated herein by reference in their entirety.

FIELD OF THE INVENTION

The present invention relates generally to mounting systems for electronic devices. More particularly, the present invention relates to tilting mount systems for flat-panel televisions and similar devices.

BACKGROUND OF THE INVENTION

In recent years, flat-panel television units have become enormously popular in both the commercial and the residential sectors. As the prices for plasma and liquid crystal display (LCD) flat panel displays have continued to fall, and as the quality for the same devices has improved, more and more businesses and individuals have purchased such devices both for business and home entertainment purposes.

One of the advantages of flat-panel television units that customers have found particularly appealing is their relatively low thickness. Because conventional "tube" televisions have a relatively large depth, the display options for such devices are quite limited. In the residential setting, most users require a television stand or large entertainment center to store the television. Such stands or entertainment centers can take up significant floor space, which is often undesirable. In the commercial or educational setting, users will often install large overhead mounting systems that can contain the television. However, these systems usually require professional installation and, once the television is secured in the mount, it is often very difficult to access and adjust due to its height.

With flat-panel televisions, on the other hand, users are presented with a relatively new option: mounting the television directly to a wall. By mounting the television to a wall, a person can eliminate the need to take up potentially valuable floor space with a television stand or entertainment unit. Furthermore, individuals and entities can mount the television at a sufficiently low height to be able to adjust the television's orientation with little difficulty.

Although the introduction of flat-panel televisions on a wide scale has presented new opportunities to both residential and commercial customers, it has also presented new challenges. Over the past few years, a number of wall mounting systems have been developed for use with flat panel televisions, but each has its own drawbacks. For example, U.S. Pat. No. 6,402,109 discloses a wall mounting system that permits a flat panel television to have a limited range of motion once it is mounted to the wall. Although somewhat useful, the system described in this reference has only a limited range of motion, is relatively expensive to manufacture due to the number of components, and provides the user with no ability to rotate the television about an axis that is substantially perpendicular to the ground. Additionally, such a system provides the user with no ability to pull the television away from the wall, further limiting the television's range of motion.

U.S. Pat. No. 6,905,101 and U.S. Application Publication No. 2004/0245420 disclose mounting systems that provide the television with a greater degree of potential motion. However, the systems described in these references are extremely complex in nature, particularly when an articulating arm is included to permit the television to be pulled away from the wall. More particularly, the articulating arm on such products often has up to three separate joints, each of which adds to the product's complexity and cost to manufacture. The multiple joints also cause additional friction to exist in the system, which can wear out plastic components rather quickly. Additionally, such designs can have significant stability and control issues when the television is pulled away from the wall, as the mass of the television creates a significant moment that can place significant forces on the single articulating arm. This can pose both product integrity and safety issues. Furthermore, such systems can be so large, heavy and bulky that installation becomes exceedingly difficult, often requiring two or more persons to correctly install the device. This is particularly problematic for flat panel televisions, which are often heavier than conventional tube televisions. Lastly, such mounting systems often cannot "collapse" into a very low profile when the television is not intended to be extended away from the wall. This can result in a loss of space in a room and create the appearance of increased clutter.

It would therefore be desirable to provide a wall mounting system that is simple in design, easy to install, while still being constructed to permit users to orient a flat panel display in a variety of positions.

SUMMARY OF THE INVENTION

The present invention provides an improved mounting system for flat panel televisions and display units. The mounting system of the present invention includes a base plate and an adapter plate. The base plate mounts to a fixed surface, such as a wall, while a flat panel display mounts to the adapter plate. First and second sliding arms operatively engage both the base plate and the adapter plate. The sliding arms are configured to travel through a plurality of slots in the base plate in order to permit the adapter plate to translate away from and toward the base plate as desired. Additionally, the sliding arms are configured to permit the adapter plate to rotate relatively to the base plate.

The present invention provides for an improved mounting assembly that is simple in construction, simple to install, easy to operate, and provides the user a wide range of positioning options. In addition, the mounting system possesses a very thin profile, making it barely visible in many ordinary-use conditions. In fact, in the event that the mount can be recessed into the wall, the mount can have virtually no actual profile at all beyond the wall. By providing a variety of different positioning options, the mounting system permits the user to adjust the television in order to provide alternative viewing angles, as well as reduce or eliminate glare from sunlight or other light sources, while also generating a relatively low level of friction in the process. Furthermore, the simplicity of the mounting system of the present invention adds to the product's overall sturdiness and stability.

These and other advantages and features of the invention, together with the organization and manner of operation

DETAILED DESCRIPTION OF THE PREFERRED EMBODIMENTS

Figure 1:
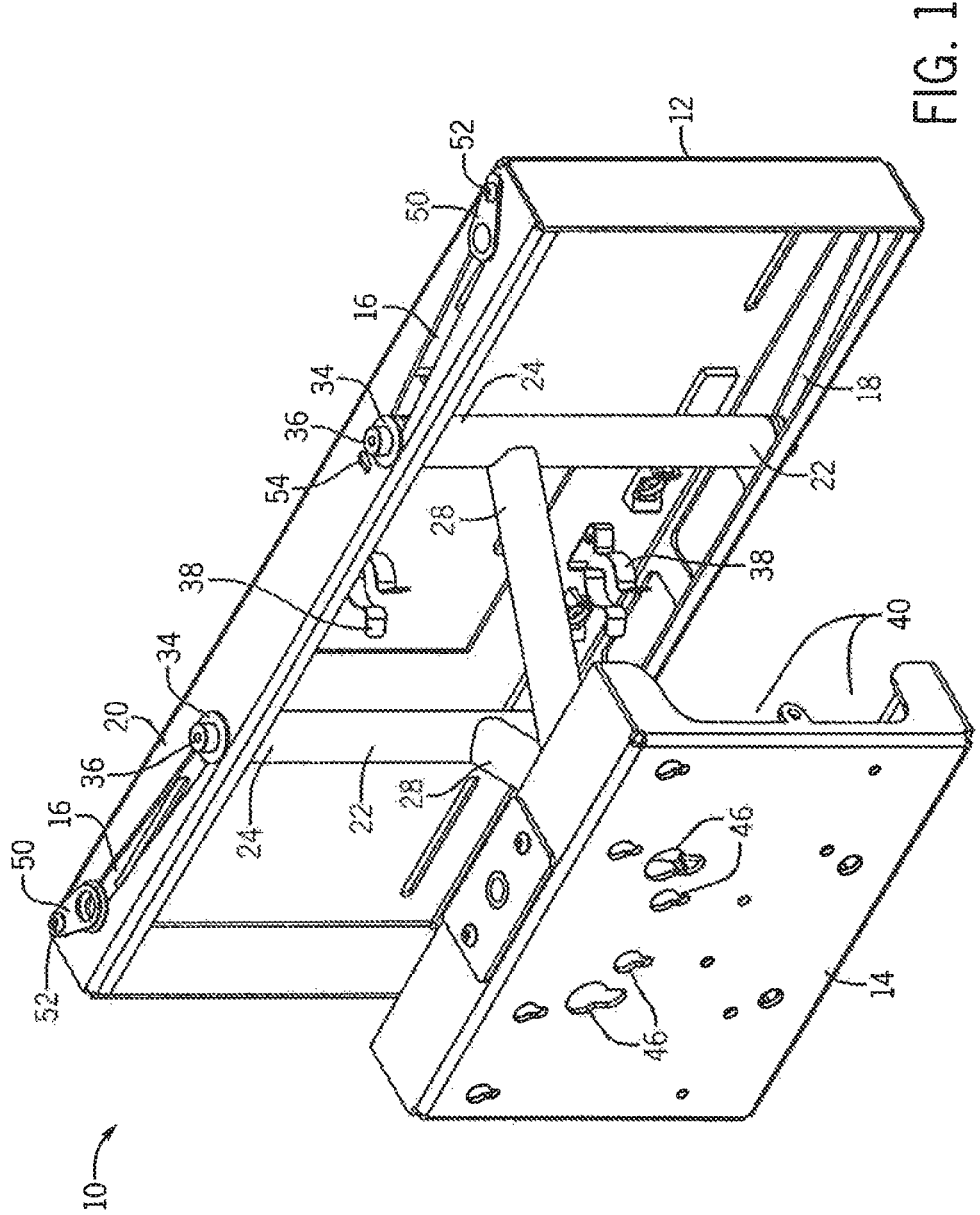
FIG. 1 is a perspective view of a mounting system constructed in accordance with one embodiment of the present invention, with the adapter plate in an extended position.
Figure 2:
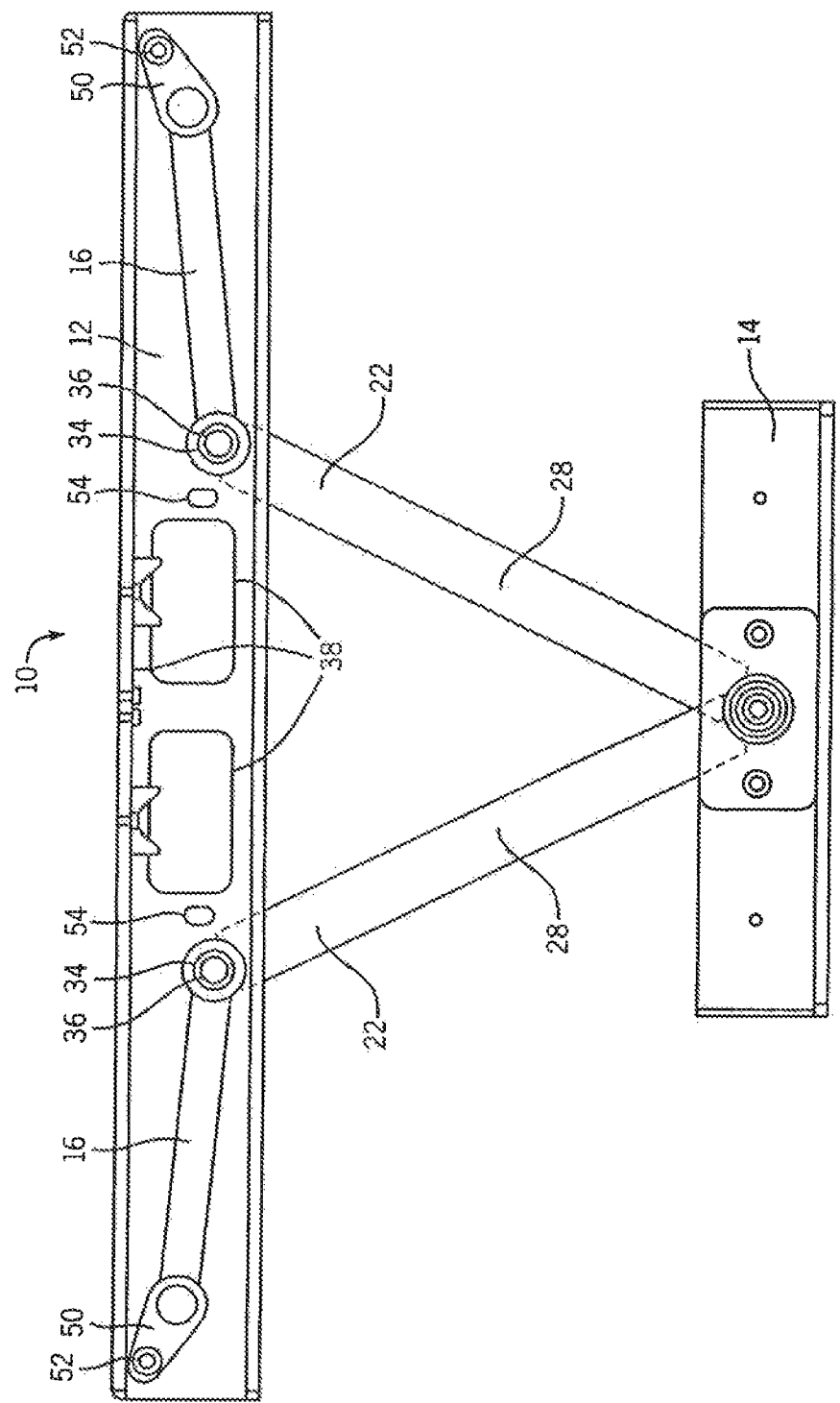
FIG. 2 is a top view of the mounting system of FIG. 1, with hidden components shown in phantom.
Figure 3:
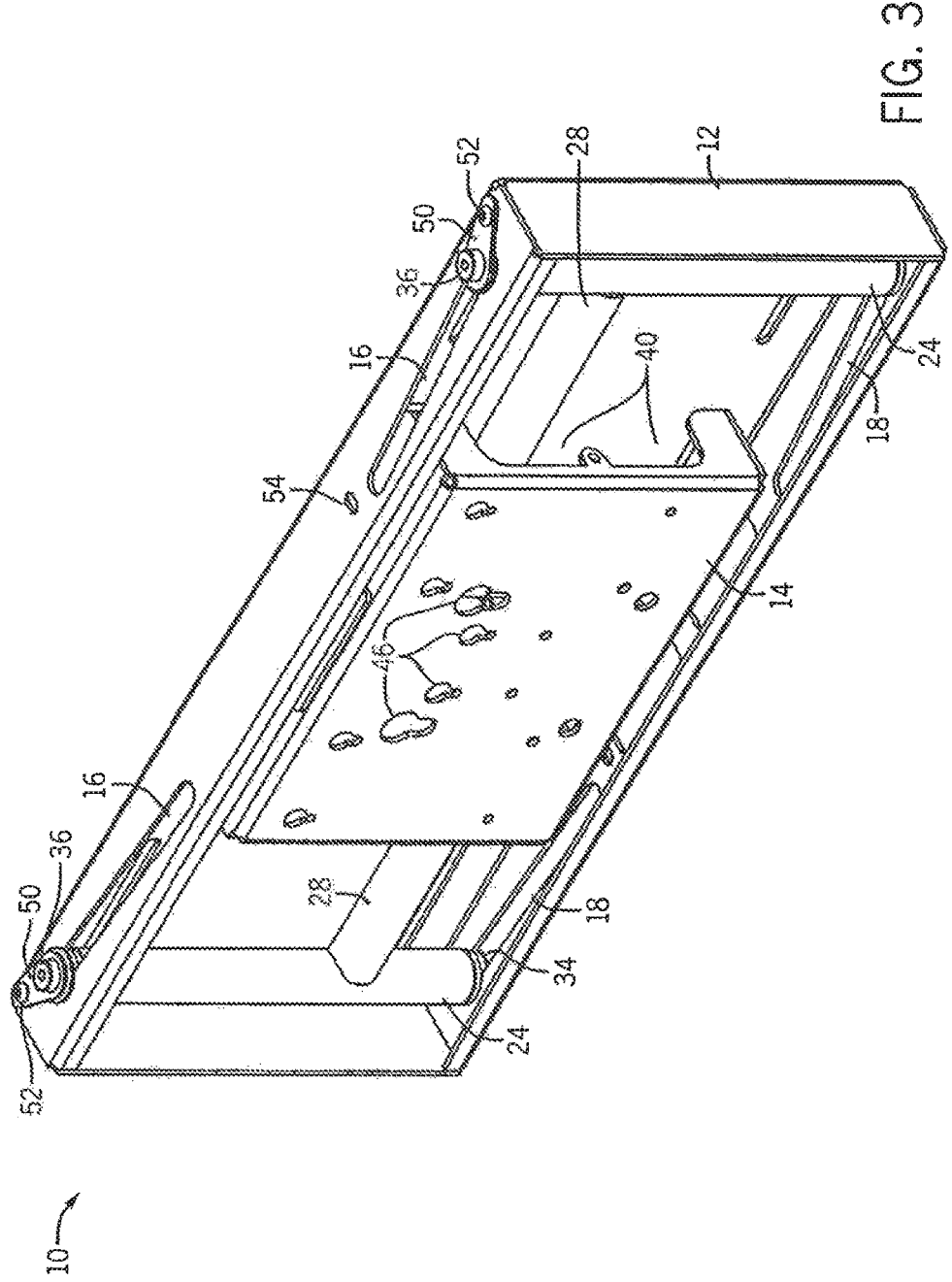
FIG. 3 is a perspective view of the mounting system of FIG. 1 when in a retracted position.

As shown in FIGS. 1-3, a mounting system 10 according to one embodiment of the present invention comprises a base plate 12 and an adapter plate 14. The base plate 12 is configured to attach to a flat surface such as a wall, while the adapter plate 14 is configured to attach to a flat panel television or display. When the mounting system 10 is fully assembled, the base plate 12 and the adapter plate 14 are operatively connected to each other via a plurality of connecting arms 22. It should be understood that, as used herein, the phrase "operatively connected" does not require that the two components in question be physically connected to or in physical contact with each other. Instead, an operative connection can involve the use of a number of intermediate components.

Figure 4:
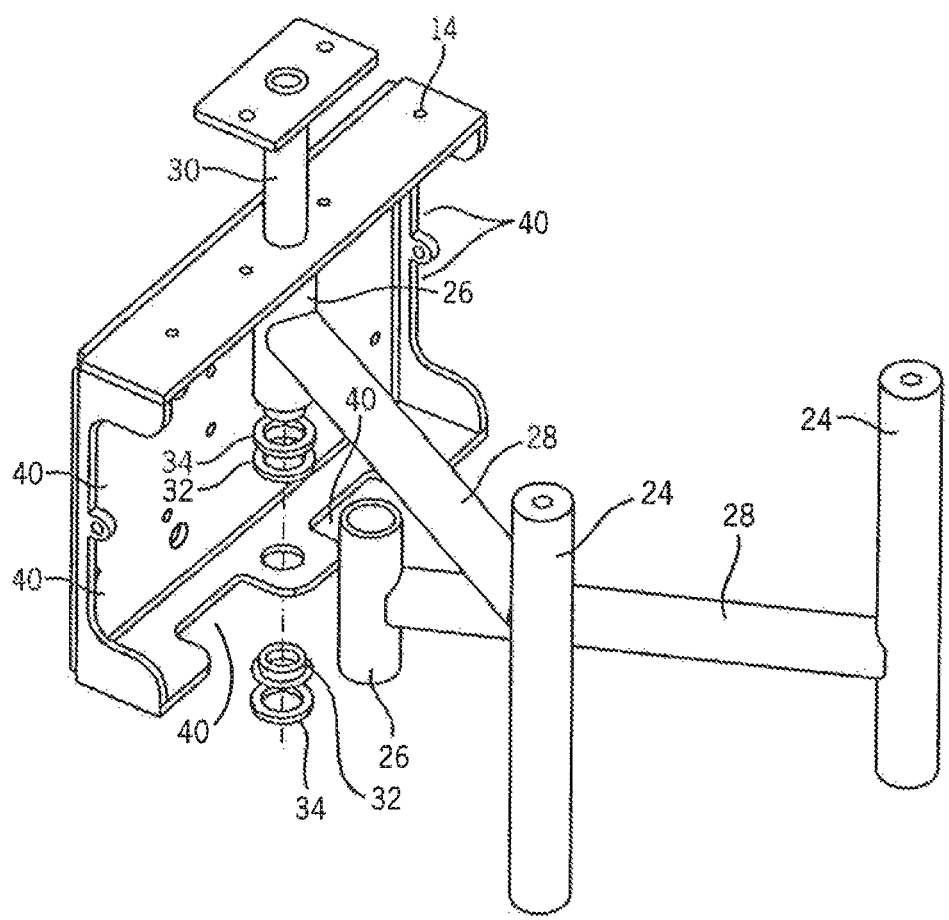
FIG. 4 is a reverse perspective view of the mounting system of FIG. 1, in a first disassembled position with the base plate removed.
Figure 5:
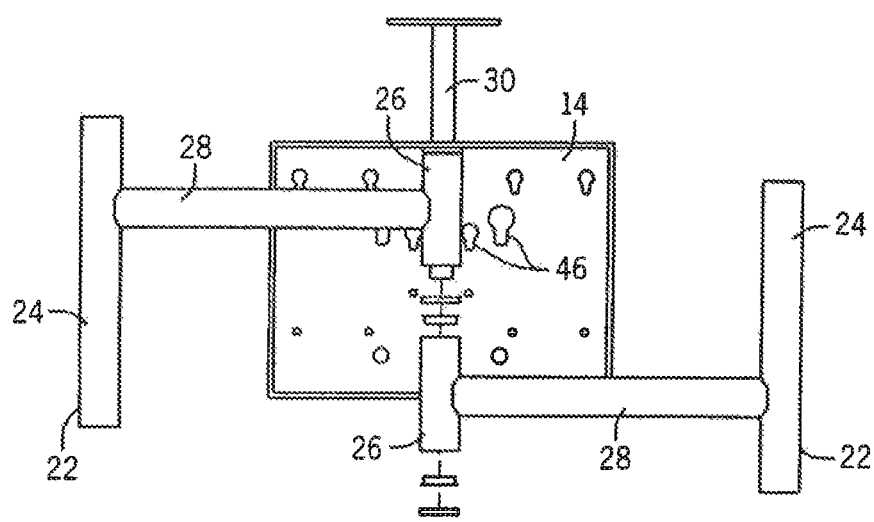
FIG. 5 is a rear view of the mounting system of FIG. 1, in a second partially disassembled position with the base plate removed.
Figure 6:
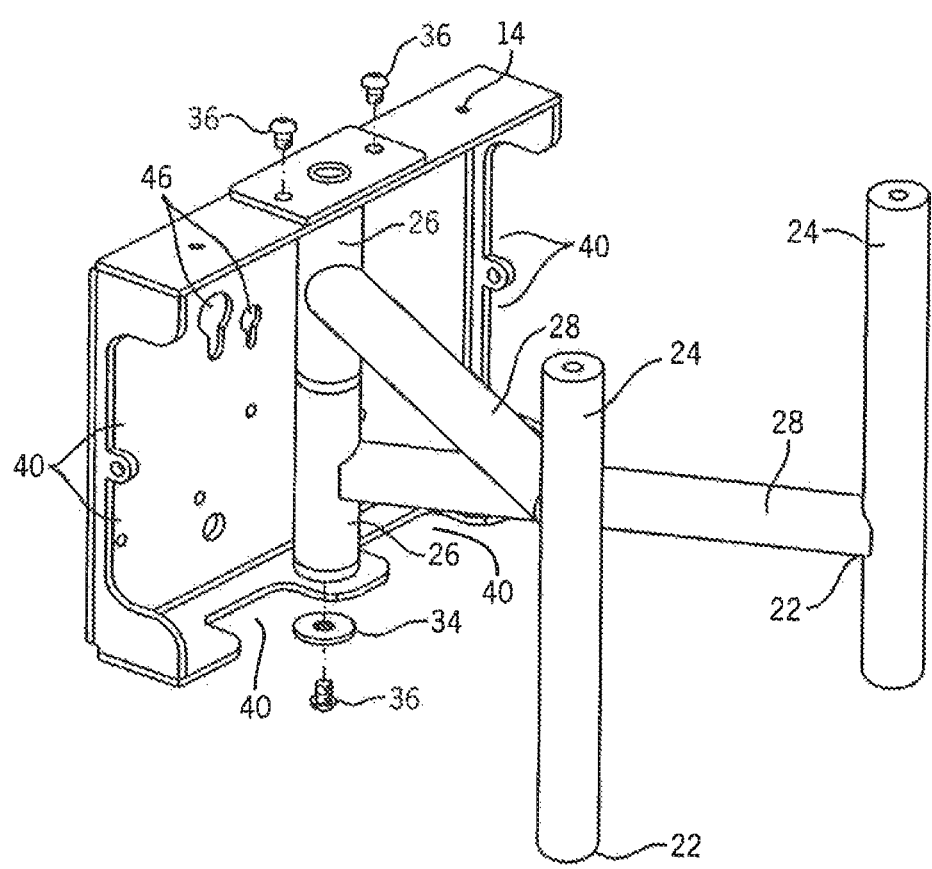
FIG. 6 is another reverse perspective view of the mounting system of FIG. 1, in a third partially disassembled position with the base plate removed.

As is shown in detail in FIGS. 4-6, each of the plurality of connecting arms 22 comprises a base plate engagement portion 24, an adapter plate engagement portion 26, and an intermediate portion 28. In one embodiment of the invention, both the base plate engagement portion 24 and the adapter plate engagement portion 26 are fixedly connected and are substantially perpendicular to the intermediate portion 28, with the intermediate portion 28 being substantially perpendicular to both the base plate 12 and the adapter plate 14. However, it is also possible for these components to be connected to each other at a non-perpendicular orientation, and it is also possible for the components to be releasably secured to each other. With regard to the orientation of the components, for example, it is possible for any or all of the components to have a slight non-perpendicular orientation in order to give the adapter plate 14 and connected display a negative tilt, which would be beneficial for systems that are mounted near the ceiling. The adapter plate 14 may also include one or more relief cutouts 40 within the lower surface thereof. These relief cutouts 40 can be used for cord management purposes, permitting a user to route power cords and other cords as necessary. Relief cutouts 40 may also be located in the sides or top of the adapter plate 14 as necessary.

As shown in FIGS. 1-3, the base plate 12 includes a plurality of upper slots 16 on a top surface thereof, as well as a plurality of lower slots 18 on a lower surface thereof. The plurality of upper slots 16 and the plurality of lower slots 18 are configured to accept the respective top and bottom portions of the base plate engagement portion 24 of each connecting arm 22. In one embodiment of the invention, the base plate engagement portions 24 are slidably connected to the base plate 12 via fasteners 36 and washers 34, although other connection mechanisms known in the art may also be used. Side portions of the base plate 12 may also include grommets 42 comprising vinyl-lined steel or similar materials. The grommets 42 can be strategically placed to contact a display unit (not shown) when the display unit is attached to the adapter plate 14 and when the mounting system 10 is in a fully retracted position.

As is shown in FIGS. 4-6, the connecting arms 22 are also operatively connected to the adapter plate 14. In the embodiment shown in FIGS. 4-6, this is accomplished through the use of an axial rod 30. The axial rod 30 passes through both the top and bottom of the adapter plate 14, as well as the adapter plate engagement portion 26 of the plurality of connecting arms 22. The axial rod 30 is then secured via conventionally-known fasteners 36 to the top and bottom of the adapter plate 14. Washers 34 can also be used in this portion of the mounting system 10. By passing the axial rod 30 through the adapter plate engagement portion 26, without physically attaching to it, the adapter plate engagement portion 26 is capable of rotating relative to the adapter plate 14 as necessary or desired.

Figure 7:
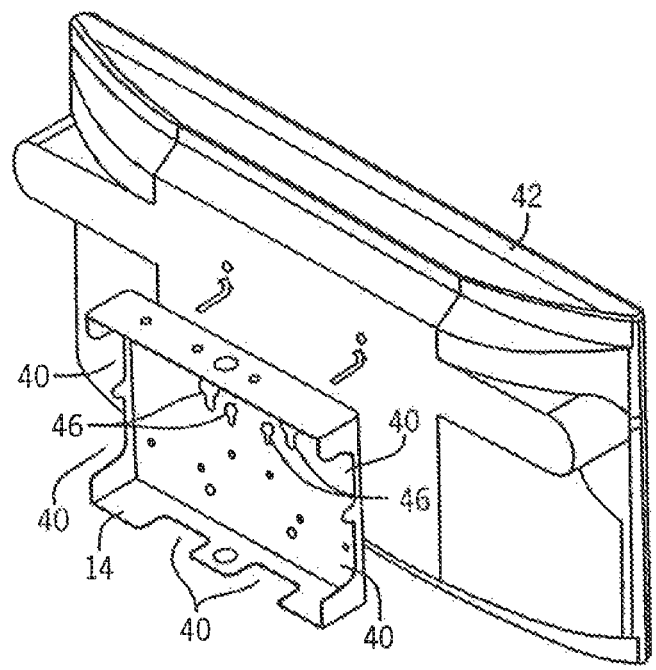
FIG. 7 is a view showing the process for attaching the adapter plate directly to the back of a flat panel display.
Figure 8:
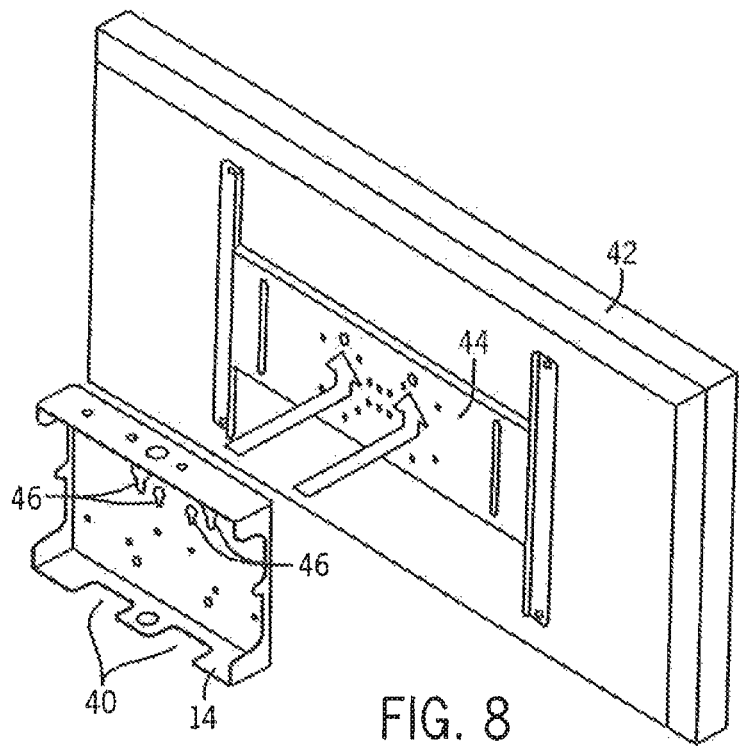
FIG. 8 is a view showing the process for attaching the adapter plate to the back of a flat panel display via an intermediate bracket.

As shown in FIG. 7, the adapter plate 14 is configured to attach directly to the back of a display unit 42. In particular, the adapter plate 14 includes a variety of mounting holes 46 through which screws or bolts can pass before being connected to the display unit 42. Some or all of the variety of mounting holes 46 can be strategically placed to match with corresponding holes on displays that are compliant with Video Electronics Standards Association (VESA) standards. Furthermore, the mounting holes 46 can be configured such that a rotational adjustment of the display unit 42 relative to the adapter plate 14 is permissible about an axis substantially parallel to the axes of mounting holes 46. FIG. 8 shows an alternative embodiment of the invention, where the adapter plate 14 is attached to the display unit 42 via an intermediate plate 44.

The operation of the mounting system 10 of FIGS. 1-6 is generally as follows: FIG. 3 shows the mounting system 10 in a fully retracted position, where the adapter plate 14 and the associate television or display unit 42 is not extended away from the wall or other mounting surface. In this position, the base plate engagement portion 24 of the plurality of connecting arms 22 is positioned at the farthest possible points in the plurality of upper and lower slots 16 and 18 of the base plate 12 from the center of the base plate 12 as possible. In this position, the profile or depth of the mounting system 10 is at a minimum. It should be noted that the mounting system 10 may also include a plurality of locking tabs 50 for securing the base plate engagement portion 24 in this position. The locking tabs, which can be positioned at the top and/or the bottom of the mounting plate 12. A locking tab fastener 52 is used to fix the respective locking tab 50 with a locking tab hole 54, and the opposite side of the locking tab 50 is used to secure the base plate engagement portion 24 via the fasteners 36. The locking tab holes 54 can be positioned at both ends of each upper slot 16 and lower slot 18, as well as other positions as necessary or desired.

When a user wishes to pull the display unit 42 away from the wall or other mounting surface, he or she simply pulls the display unit 42 in the desired direction. This pulling movement causes the base plate engagement portion 24 to slide along the plurality of upper and lower slots 16 and 18 towards the center of the base plate 12. As this occurs, the adapter plate engagement portion 26 rotates as necessary about the axial rod 30. The mounting system 10 in the fully extended position is shown in FIGS. 1-2. Because of the vertical orientation of the base plate engagement portion 24 and the horizontal nature of the plurality of upper and lower slots 16 and 18, there is little risk of any undesired translational movement of the adapter plate 14 relative to the base plate 12.

In addition to the above, the mounting system 10 of FIGS. 1-3 also permits the adapter plate 14 and any attached television or display unit 42 to rotate or pan as desired by the user. In particular, because the adapter plate engagement portion 26 is not physically joined to the axial rod 30 or the adapter plate 14, the adapter plate 14 is capable of rotating about an axis corresponding to the major axis of the axial rod 30. In a conventional wall-mounting setup, this results in the adapter plate 14 and any attached device being capable of rotating to the left or right. This permits the user to alter the orientation of the device for any reason, such as to prevent sunlight-induced glare.

Figure 12:
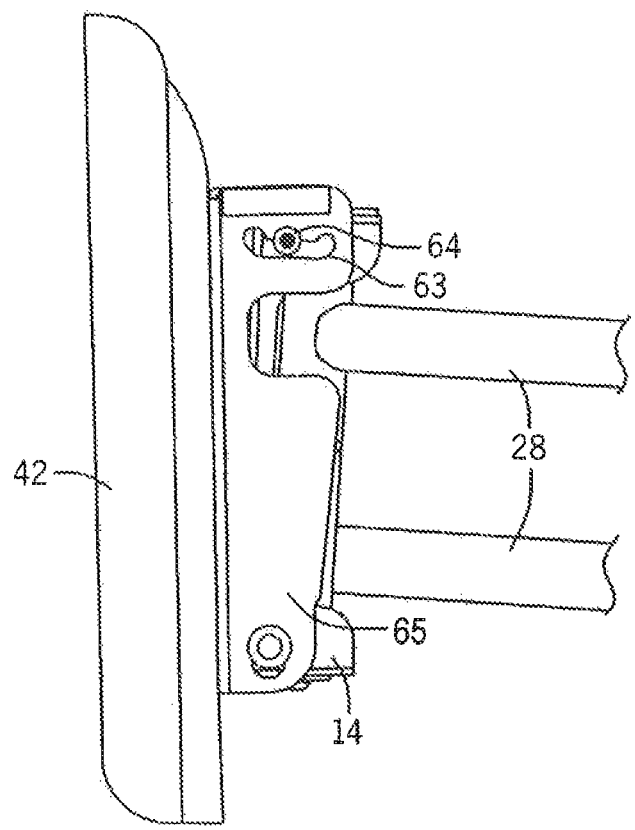
FIG. 12 is a view of a further embodiment of the mounting system of FIG. 1, showing a rotatable display mount that provides for tilt of the display with respect to the mounting system.
Figure 13:
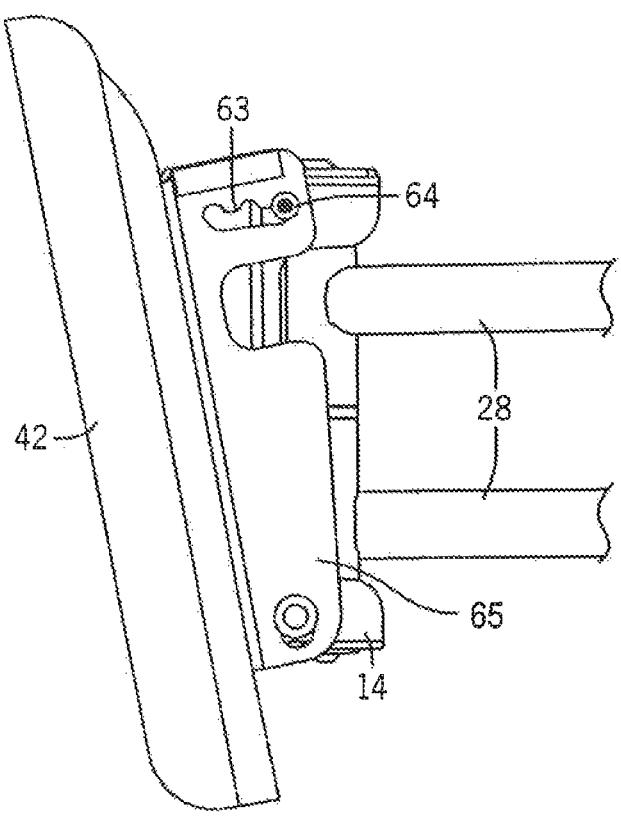
FIG. 13 is an additional view of the embodiment shown in FIG. 12, showing a second tilt position of the rotatable display mount and the display to a desired tilt angle.

Various embodiments of the present invention include other features that may also be beneficial to most users. For example, in the embodiment shown in FIGS. 1-3, a plurality of cable mounts 38 can be attached to the base plate 12 for accepting cables from the television or display unit 42. These plurality of cable mounts 38 can be used to store and direct the respective cable towards a desired location, as well as to hide the cable from view. In other embodiments of the invention, instead of having the adapter plate engagement portion 26 be substantially perpendicular to the intermediate portion 28 of the plurality of connecting arms 22, these components can be angled at other orientations relative to each other. For example, the adapter plate engagement portion 26 can be slightly angled such that the adapter plate 14, and therefore any attached television or display unit 42, has a slight negative tilt. In a case where a television is mounted along a wall near the ceiling, this can provide a better angle for viewing. It should also be noted that various embodiments of the present invention can comprise mounting systems 10 that are capable of tilting about other axes than the systems shown in FIGS. 1-11. For example, as shown in the embodiments illustrated in FIGS. 12-13, a display mount 65 is attached to the adapter plate 14 and is capable of tilting upward and/or downward, i.e., about an axis that is substantially perpendicular to the translational direction of the adapter plate and substantially parallel to the mounting surface of the mounting plate 12. In this embodiment, it is further possible to incorporate a plurality of preset tilt angles 63, whereby the tilt of the display mount 65 relative to the adapter plate 14 may be conveniently and securely established through a conventional fastener 64 or other locking mechanism known in the art.

Figure 9:
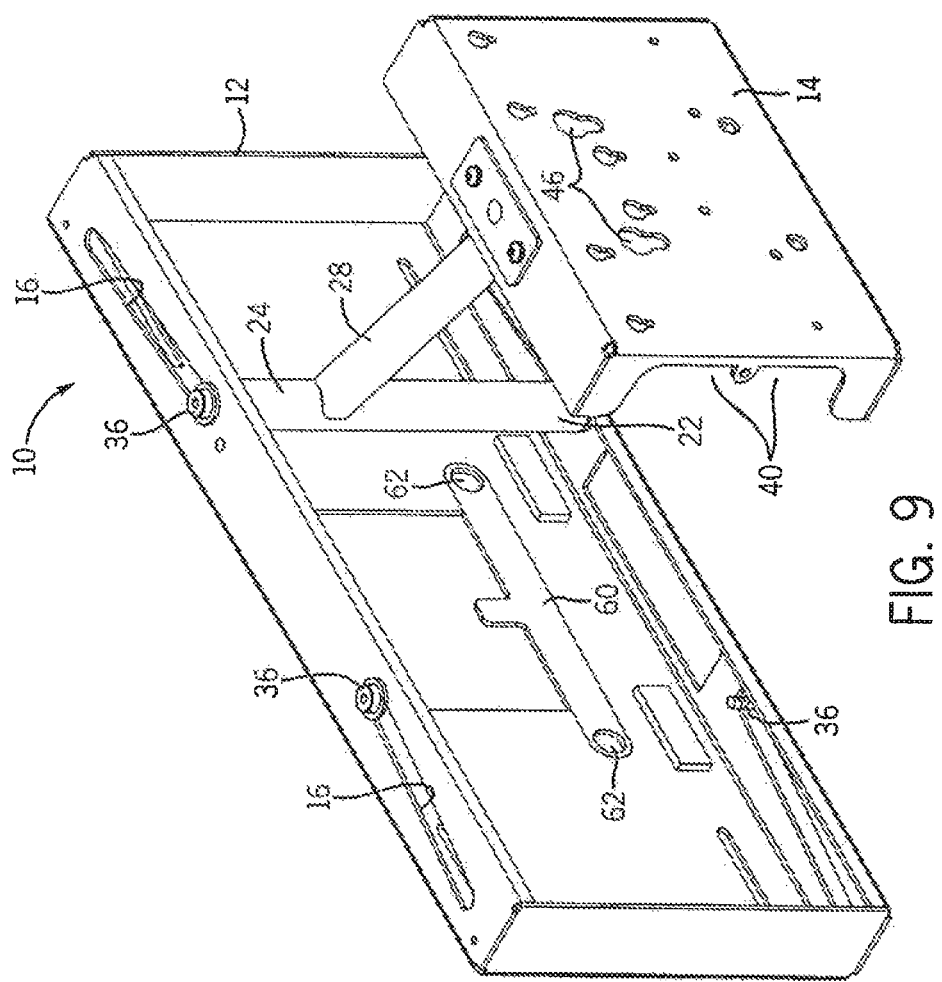
FIG. 9 is a perspective view of a portion of a mounting system constructed according to a second embodiment of the present invention, where an integrated locking member is securely positioned within the base plate.
Figure 10:
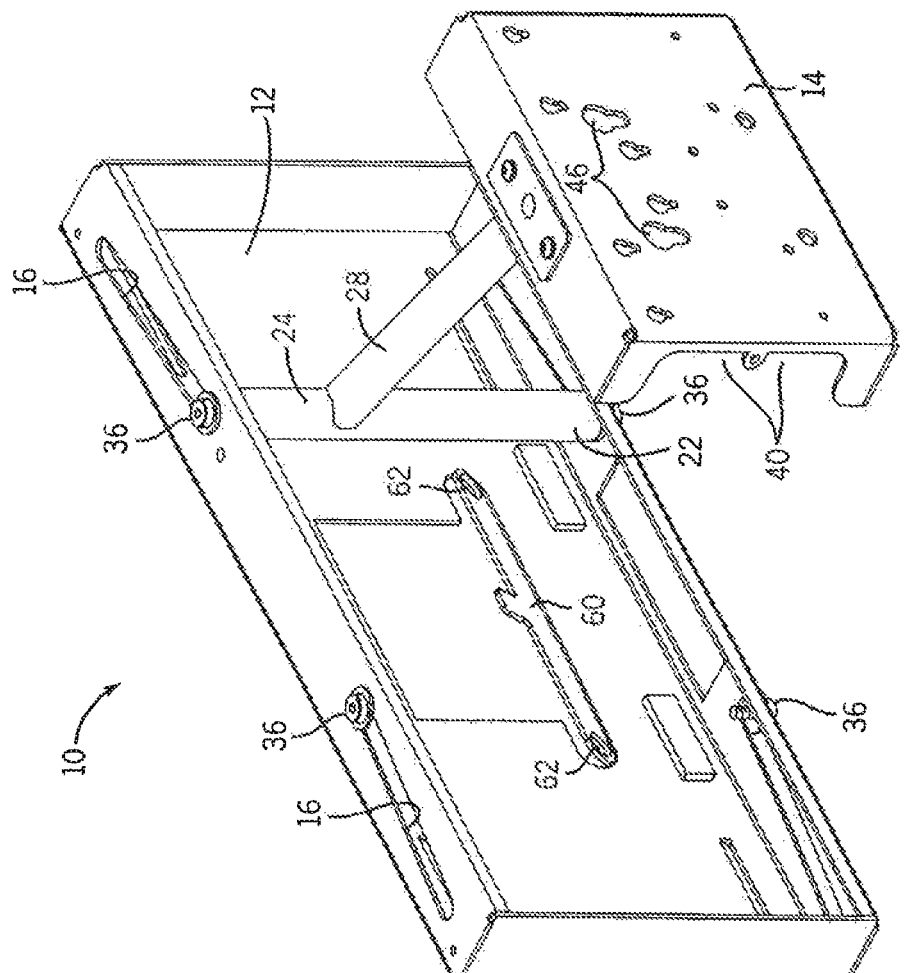
FIG. 10 is a second perspective view of a portion of the mounting system of FIG. 9, where the integrated locking member is in the process of being removed from the base plate.
Figure 11:
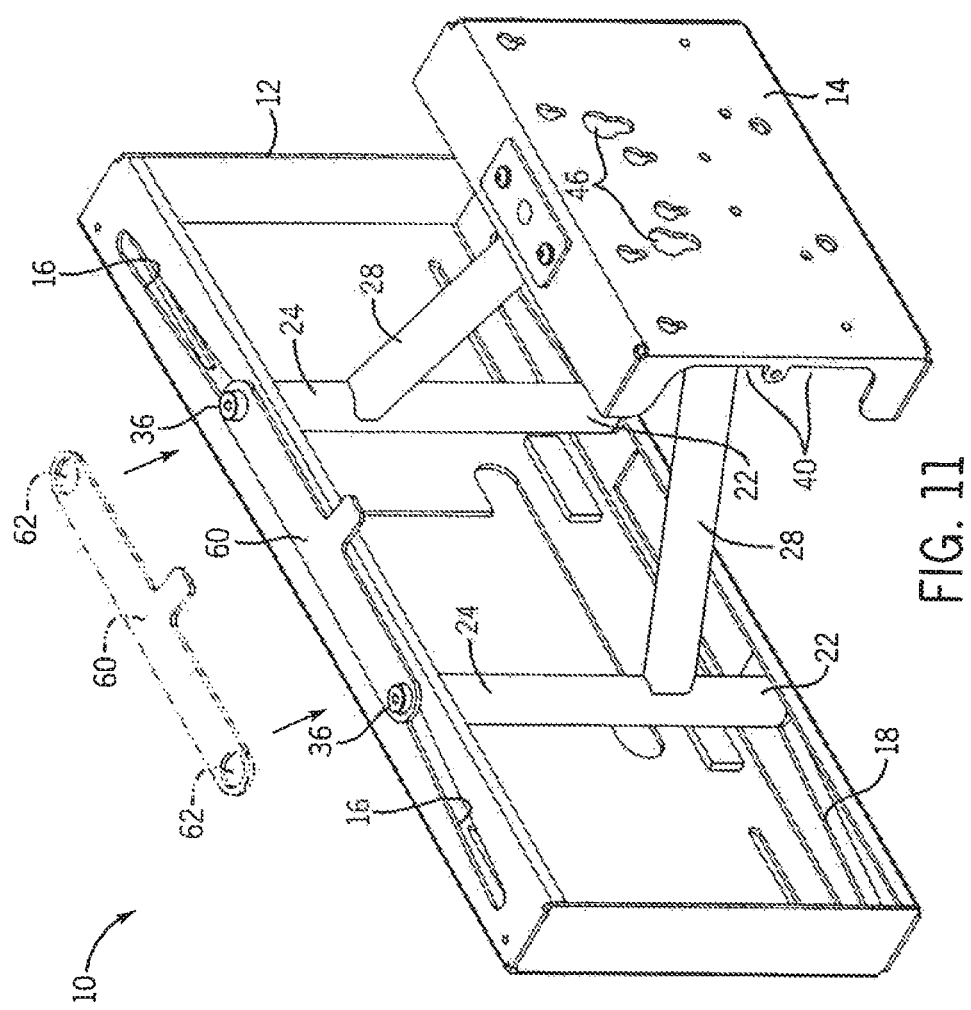
FIG. 11 is a third perspective view of a portion of the mounting system of FIG. 9, showing how the integrated locking member is used to fix the position of the mounting system in an extended position.

FIGS. 9-11 show a mounting system 10 constructed according to an alternate embodiment of the present invention. The mounting system 10 of FIGS. 9-11 includes an integrated locking member 60 that replaces the locking tabs 50 of FIGS. 1-8. The integrated locking member 60, which can be positioned within the base plate 12 in one embodiment of the invention, includes locking member holes 62 that are sized to constrain the fasteners 36 for the respective base plate engagement portions 24 when the mounting system 10 is in a fully extended position.

In addition to the embodiments described above, the principles of the present invention are also applicable to various other embodiments. For example, the arrangement of the various components in FIGS. 1-6 can essentially be reversed. There, the adapter plate 14 includes a plurality of slots for accepting one portion of the sliding arms, while an axial rod 30 is connected to the base plate 12 and is used to align the other ends of the axial rod 30. It is also possible to substitute the axial rod 30 with other components that allow the adapter plate engagement portion 26 to rotate while still being secured (directly or indirectly) to the adapter plate 14. Other embodiments and modifications would be understood and recognized by those skilled in the art.

The foregoing description of embodiments of the present invention has been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A display system, comprising:
 a display unit; and
 a mounting system, comprising:
  a base portion including an upper portion and a lower portion substantially parallel to the upper portion;
  an adapter portion;
  a device mount operatively connected to the display unit, the device mount movably coupled to the adapter portion; and
  a pair of connecting arms, each of the pair of connecting arms including:
   a base engagement portion extending between the upper portion and the lower portion of the base portion, the base engagement portion translatable from a first position to a second position via a top portion of the base engagement portion moving relative to the upper portion of the base portion and a bottom portion of the base engagement portion moving relative to the lower portion of the base portion, an adapter engagement portion movably coupled to the adapter portion, and an intermediate portion extending between the adapter engagement portion and the base engagement portion, wherein the intermediate portion is selectively nested within the base portion when the base engagement portion is at the first position, wherein at least a substantial part of the intermediate portion is not nested within the base portion when the base engagement portion is at the second position;

wherein a movement of each base engagement portion between the first position and the second position results in a translational movement of the adapter portion relative to the base portion; and wherein the adapter portion is selectively moveable about a first axis relative to the adapter engagement portions and relative to the base portion, the first axis being substantially parallel to the base engagement portions of the pair of connecting arms.

2. The display system of claim 1, further comprising an intermediate plate coupled to the display unit, and wherein the device mount is operatively connected to the display unit via the intermediate plate.

3. The display system of claim 1, wherein each of the pair of connecting arms is selectively nestable within an aperture defined by the upper portion and the lower portion within the base portion.

4. The display system of claim 1, wherein the translational movement of the adapter portion relative to the base portion increases a distance between the adapter portion and the base portion when each base engagement portion is moved from the first position to the second position.

5. The display system of claim 1, further comprising a locking member selectively engageable with the base engagement portion of each of the pair of connecting arms when the adapter portion is in the second position, thereby substantially locking the adapter portion in the second position.

6. The display system of claim 1, further comprising a plurality of locking tabs coupled to the base portion, each of the plurality of locking tabs securing the base engagement portion of one of the pair of connecting arms when the respective base engagement portion is in the first position.

7. The display system of claim 1, wherein the device mount is selectively moveable about a second axis relative to the adapter portion, the second axis being perpendicular to the first axis.

8. The display system of claim 7, wherein the device mount includes at least one passageway including a plurality of extensions therein, and wherein engagement of a fastener with a respective extension of the plurality of extensions results in a setting of a preset tilt angle of the device mount relative to the adapter portion.

9. The display system of claim 1, wherein the adapter portion defines a plurality of mounting holes.

10. The display system of claim 9, wherein the display unit is rotatable relative to the adapter portion about a horizontal axis when the base portion is mounted to a wall.

11. The display system of claim 1, further comprising a plurality of cable mounts attached to the base portion, the plurality of cable mounts configured to accept cables emanating from the display unit.

12. The display system of claim 1, wherein the display unit comprises a flat panel television.

* * * * *